United States Patent [19]

Mitterbacher et al.

[11] 4,223,496
[45] Sep. 23, 1980

[54] HIGH PRESSURE, HIGH-TEMPERATURE VESSEL, ESPECIALLY FOR NUCLEAR REACTORS

[75] Inventors: Paul Mitterbacher, Ketsch; Schöning, Josef, Hambrücken; Hans G. Schwiers, Ketsch, all of Fed. Rep. of Germany

[73] Assignee: Siempelkamp Giesserei GmbH & Co. KG, Krefeld, Fed. Rep. of Germany

[21] Appl. No.: 897,849

[22] Filed: Apr. 19, 1978

[30] Foreign Application Priority Data

Apr. 21, 1977 [DE] Fed. Rep. of Germany ....... 2717705

[51] Int. Cl.² ............................................ C04G 11/04
[52] U.S. Cl. ........................................ 52/224; 52/249; 220/3
[58] Field of Search ................. 220/3, 3.1; 52/224, 52/249, 248

[56] References Cited

U.S. PATENT DOCUMENTS

| Re. 29,777 | 9/1978 | Crowley | 52/248 |
|---|---|---|---|
| 1,102,813 | 7/1914 | Stocker | 52/249 |
| 2,439,806 | 4/1948 | Heineman | 52/249 |
| 2,684,171 | 7/1954 | Ernst | 52/249 |
| 3,106,227 | 10/1963 | Crowley | 52/224 |
| 3,226,895 | 1/1966 | Waite | 52/248 |
| 3,355,357 | 11/1967 | Sage | 52/224 |
| 3,398,493 | 8/1968 | Massey | 52/224 |
| 3,503,171 | 3/1970 | Frohly | 52/249 |

FOREIGN PATENT DOCUMENTS

| 2163067 | 7/1972 | Fed. Rep. of Germany | 52/224 |
|---|---|---|---|
| 1383549 | 11/1964 | France | 52/224 |
| 214464 | 8/1967 | Sweden | 52/224 |

Primary Examiner—James A. Leppink
Assistant Examiner—Henry E. Raduazo
Attorney, Agent, or Firm—Karl F. Ross

[57] ABSTRACT

A pressure vessel susceptible to high temperatures, especially for containment of a nuclear-reactor core, is constituted of a cylindrical shell from a cast material such as cast steel, cast iron or concrete, and is prestressed by vertical cables which extend parallel to generatrices of the shell. Peripheral (circumferential) prestressing cables are provided around the shell which can be externally insulated. The peripheral tensioning cables are exposed externally of the insulation material and bear upon the shell of the vessel with heat-resistant elements of high compressive strength which extend through the external insulation.

9 Claims, 4 Drawing Figures

HIGH PRESSURE, HIGH-TEMPERATURE VESSEL, ESPECIALLY FOR NUCLEAR REACTORS

CROSS-REFERENCE TO RELATED APPLICATIONS

The present application is related to the commonly assigned copending applications: Ser. No. 824,309 of Aug. 12, 1977 (now U.S. Pat. No. 4,125,202), Ser. No. 790,536 of Apr. 25, 1977, and Ser. No. 894,374 of Apr. 7, 1978, and to the patents and applications mentioned therein or cited in the files thereof.

Field of the Invention

The present invention relates to a pressure vessel resistant to high temperatures and high pressures and, more particularly, to a pressure vessel for containment of nuclear materials under pressure and, especially, for enclosing a nuclear-reactor core.

Background of the Invention

As will be apparent from perusal of the aforementioned applications and patents, it is known to provide an upright cylindrical pressure vessel as the containment for a nuclear-reactor core and to constitute such a vessel from ring-shaped or cylindrical-segmental elements which are maintained in place and/or are inwardly or axially prestressed by tension elements. Such tension elements can be cables uniformly spaced about the axis of the vessel and extending parallel to generatrices thereof and, therefore, parallel to the axis of the vessel in the vertical direction. These cables apply an axial stress to the walls of the vessel. In addition, the vessel is inwardly stressed, to resist outward pressures and forces, by circumferential cables which can surround the segments or rings constituting the wall of the vessel. In addition, a pressure-resistant top or cover can be applied to the vessel and the latter may have a pressure-resistant bottom structure as well.

It is also a common practice in this field to provide the cylindrical vessel wall of a cast material, especially cast iron, cast steel or concrete, and to pass the vertical tension cables through passages extending parallel to the axis of the vessel and formed in this wall. Peripheral tension cables may also be provided and the outer surface of the cast-material vessel can be surrounded by a body or layer of thermal insulation. It is known, in this connection, to provide the vertical tension cables within the aforementioned passages, with a heat-protective means such as a heat-lagging thermal insulation or with active cooling, e.g. forced fluid cooling.

In one such system, described in German open application (Offenlegungsschrift) DE-OS No. 26 24 205, for example, the vertical stressing cables as well as the peripheral stressing cables are embedded in insulating material or cooled. While this system permits an effective prestressing of the vessel in a cold state, it does not allow for simple control of the inward stressing force subsequent to operation of the nuclear reactor or other adjustments in the stressing forces applied by the cables.

While one can conceive of providing control or adjustment means above or below the cover or bottom of the vessel for varying the stress applied by the vertical cables, such means is impractical for the peripheral cables since the latter are substantially inaccessible in the insulation or respective heat-protection system.

Objects of the Invention

It is, therefore, the principal object of the present invention to provide a pressure vessel of improved high-pressure and high-temperature resistance which will obviate the difficulties encountered with earlier systems.

Still another object of this invention is to provide an improved high-pressure, high-temperature vessel, especially for the containment of a nuclear-reactor core which enables control of the peripherally applied stress in a particularly convenient and simple manner.

Still another object of the invention is to provide a vessel of the class described which is improved so as to enable access to the peripheral-stressing cables.

Summary of the Invention

These objects and others which will become apparent hereinafter are attained, in accordance with the present invention, in a high-pressure, high-temperature vessel, especially adapted to serve as a nuclear-reactor pressure vessel, which comprises in accordance with prior-art principles:

(a) a cylindrical vessel shell constituted of cast material, such as cast iron, cast steel or concrete;

(b) vertical stressing cables extending parallel to generatrices of the cylindrical vessel;

(c) peripheral stressing cables surrounding the cylindrical vessel wall and applying an inward prestress thereto;

(d) outer insulation around the vessel wall; and (e) heat-protective means for the vertical stressing cables which run through passages formed in the cast material of the cylindrical vessel wall.

In addition and in accordance with the present invention, the peripheral stressing cables are disposed externally of the outer layer or shell of insulation which sheathes the cylindrical vessel wall. Essential to this invention are heat-protective elements of high compressive strength which traverse (pass) the insulating shell and bear directly against the cylindrical vessel wall to apply the inward force of the peripheral stressing cables thereto.

Since the peripheral stressing cables are disposed externally of the insulating shell, they are readily accessible for adjustment at any time to vary the inwardly directed force which, in spite of the spaced-apart relationship of the peripheral cables and the cylindrical vessel wall, nevertheless permits the inwardly directed force to be applied uniformly to the latter via the heat-protective elements of high compressive strength. These elements, which can be heat-lagging or thermal-insulating bodies, thus have a dual function although they can be of relatively simple construction. They serve on the one hand to prevent heat transmission from the vessel wall to the exterior through the insulation shell and to the peripheral stressing cables and, on the other hand, to effect force transmission between the cables and the vessel wall.

Preferably, the heat-protective elements are provided as high-strength thermal insulators which are passed through the insulating shell to serve as supports for the cable. Alternatively they may be metal support shoes or posts provided with cooling passages.

In the system of the present invention, therefore, not only are the vertical cables capable of after-adjustment and tension control, but the inward stress applied to the vessel by the individual peripheral cables can be individually or collectively adjusted and controlled without any danger of thermal effect upon the peripheral cables. Consequently, the inward stressing forces established in the cold state are maintained even during hot operation of the systems because there is little if any heat transfer to the cables and practically no thermal relaxation thereof.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
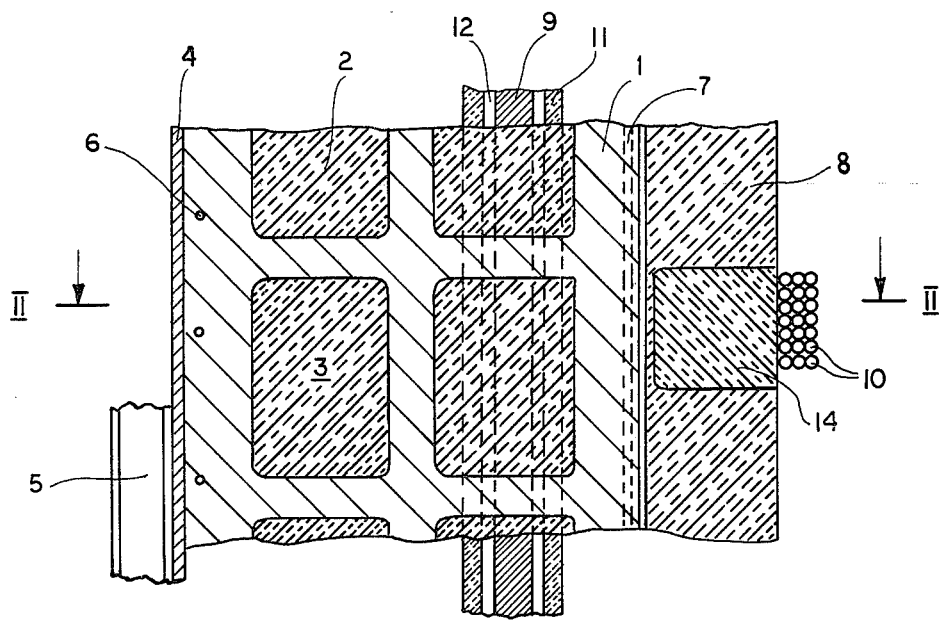
FIG. 1 is a longitudinal cross section through a pressure vessel according to the invention.
Figure 2:
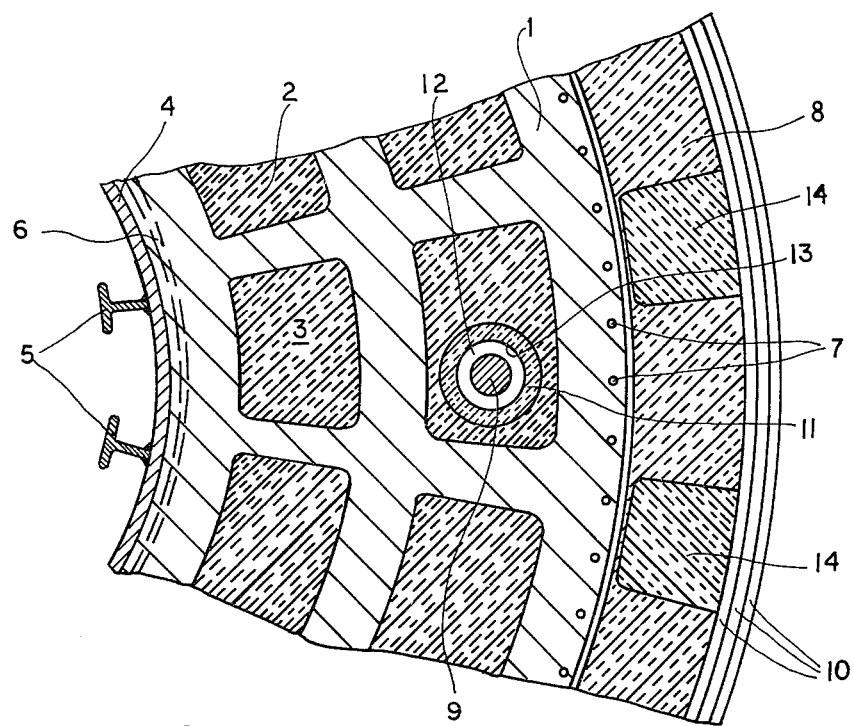
FIG. 2 is a section taken along the line II—II of FIG. 1.

FIGS. 1 and 2 show an embodiment of the invention in which a cylindrical pressure vessel generally represented at 1 is composed of cast material, e.g. cast iron, steel or concrete, and can be formed from stacked rings or cylinder segments in the manner described in the aforementioned applications.

The pressure vessel 1 is designed to receive a nuclear-reactor core and to form the primary containment for the latter.

The interior of the wall of the vessel 1 is provided with a multiplicity of cells or compartments 2 which are filled with radiation-shielding material 3, e.g. lead, serving to limit the passage of radiation from the core to the exterior.

The vessel 1 is provided with a steel liner 4 which normally is not anchored to the wall of the vessel so as to be capable of pressure expansion and contraction and relative thermal dimensional change.

To prevent buckling of the thin wall steel liner 4, the latter is provided with a plurality of angularly spaced axially extending steel reinforcing ribs 5 shown to be of T-profile and to be welded by the shank of the T, at its base, to the interior of the liner 4. In other words, the reinforcements 5 can form part of a structure affording the necessary stiffness to the liner 4.

Between the outer wall of vessel 1 and the liner 4 there is provided a heating and cooling system 6, preferably in the form of pipes or passages embedded in the cast material of vessel 1 or shaped therein during the casting process, to control the temperature of the vessel 1 proximal to the liner. This allows heating up of the vessel wall to match the rise in temperature of the liner and cooling of the vessel wall to prevent excessive temperatures from being attained. These passages 6 are preferably connected in a fluid circuit with a source of heating and/or cooling liquid and associated circulating means.

The passages 6 are, most advantageously, disposed adjacent the inner wall of the cylindrical vessel 1.

A further cooling system represented by the pipes or passages 7 (here axially extending flow paths as distinct from the helical flow paths 6) is provided immediately adjacent the outer wall of the vessel 1. The outer wall of vessel 1 is also surrounded by and, indeed, is in contact with an insulating shell 8.

The prestressing of the vessel 1 in the axial direction is effected by vertical stressing cables 9 which most advantageously are constructed of a refractory metal not noticeably relaxed by the operating temperature. The cables 9 are angularly equispaced about the vertical axis of the upright cylindrical vessel and pass through passages formed parallel to the axis therein. As noted earlier, heat cannot penetrate to these cables.

In addition, the system includes circumferential stressing cables 10 which surround the exterior of the vessel 1 in one or more turns.

The formation of heat bridges to the tables 10 from the vessel 1 are prevented by the heat-blocking devices 14 which complete the enclosure to the vessel with the insulating shell 10. The heat-blocking elements 10 are composed of materials having a high compressive strength and also serve to transfer force radially from the cables 10 to the outer wall of the vessel 1 against which the members 14 bear directly. The members 14 lie in windows or openings traversing the shell 8.

The vertical stressing cables 9 are also protected against heating by antiheating units 11 which can be composed of cylinders or tubes of thermal insulating material spacedly surrounding each cable 9 and defining a circumferential clearance 12 therearound, thereby enabling inspection of the cables and the antiheating devices 11. A coolant may be circulated through this gap and the device 11 can be provided with cooling means generally represented at 13 in the form of ribs or the like.

Figure 3:
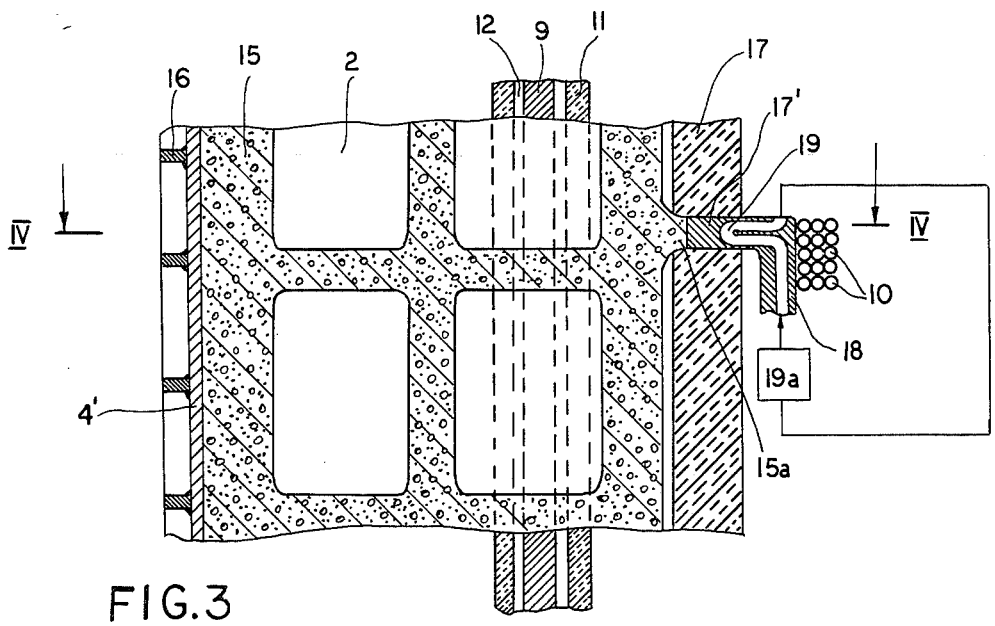
FIG. 3 is a longitudinal section through another pressure vessel according to the invention.
Figure 4:
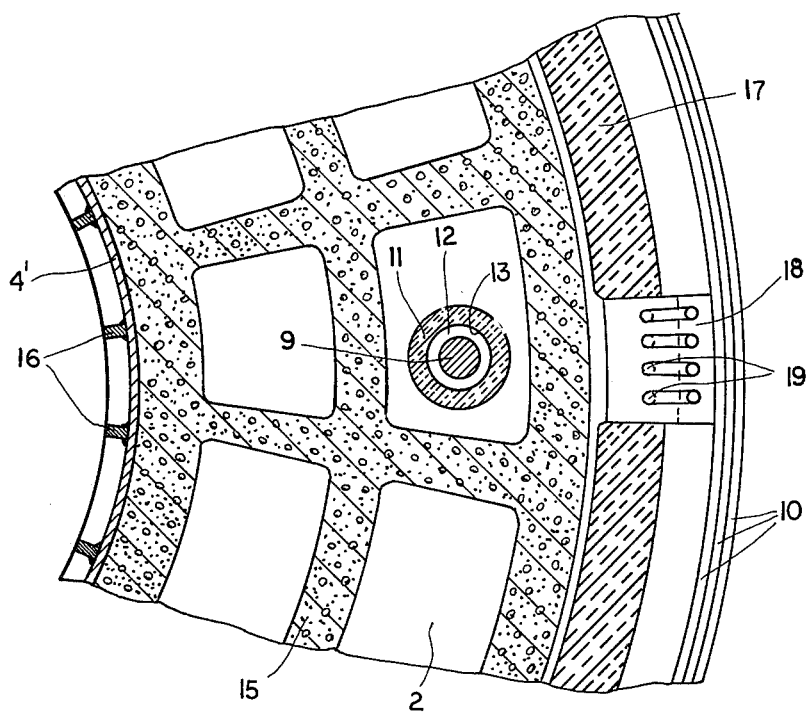
FIG. 4 is a cross section taken along the line IV—IV of FIG. 3.

The embodiments of FIGS. 3 and 4 also comprise a cylindrical pressure vessel 15 which is composed of concrete and is provided with cells 2 which can be filled with a radiation-shielding material. The steer liner 4' is utilized in this case as well, but is reinforced by vertical and horizontal ribs 16 which intersect and are welded to one another to prevent buckling. The ribs 16 may define a rectangular-cell or honeycomb structure. The exterior of the vessel 15 is provided with an insulating shell 17.

The pressure vessel 15 is stressed by the tension cables 9 in the peripheral direction utilizing the same heat-lagging means 11, 12, 13 previously described while peripheral cables 10 provide circumferential and thus radial prestressing. In this embodiment, however, the radially inwardly directed force is applied to the vessel 15 by a plurality of metallic shoes or supports 16 formed with passages 19 through which a coolant is circulated. The shoes 18 are shown to be of L-shape and the passages 19 are only illustrated diagrammatically. A source of coolant has been represented at 19a for the circulation of the cooling liquid, e.g. water through the shoes 18. The shoes 18 pass through windows 17' in the insulating shell 17 to engage circumferential ridges 15a.

What is claimed is:

1. A pressure container, especially for a nuclear reactor, comprising:
   a cylindrical pressure vessel of cast metal or concrete formed with axially throughgoing passages and having a substantially vertical axis, an outer wall and an inner wall;
   respective axial tensioning elements extending through said passages and axially stressing said vessel;
   a shell of thermally-insulating material surrounding the outer wall of said vessel and exposed to the exterior;
   circumferential stressing cables extending around the outer wall of said vessel and spaced therefrom; and a plurality of heat-blocking elements spaced around said vessel and extending through said shell while supporting said cables for transmitting inward force from said cables to said outer wall, said heat-blocking elements being composed of thermal insulation of high compressive strength.

2. The pressure container defined in claim 1 wherein said cables are disposed wholly externally of said shell to permit adjustment of the tension of said cables and hence the inward force applied by said heat-blocking elements to said wall of said vessel.

3. The pressure container defined in claim 2, further comprising heat-blocking means surrounding each of said axial stressing elements.

4. The pressure container defined in claim 3 wherein said heat-blocking means includes a tube of thermal insulation surrounding each of said axial stressing elements with clearance.

5. The pressure container defined in claim 2, further comprising a steel liner inwardly of said vessel and reinforcing means on said liner for preventing buckling thereof.

6. A pressure container, especially for a nuclear reactor, comprising:

a cylindrical pressure vessel formed with axially through-going passages and having a substantially vertical axis and an outer wall;

respective axial tensioning elements extending through said passages and axially stressing said vessel;

a shell of thermally-insulating material surrounding the outer wall of said vessel;

circumferential stressing cables extending around the outer wall of said vessel and spaced therefrom;

a plurality of heat-blocking elements spaced around said vessel and extending through said shell while supporting said cables for transmitting inward force from said cables to said outer wall, said cables being disposed wholly externally of said shell to permit adjustment of the tension of said cables and hence the inward force applied by said heat-blocking elements to said wall of said vessel, said heat-blocking elements being thermally conductive and formed with passages; and means for supplying a coolant to said passages.

7. The pressure container defined in claim 6 wherein said heat-blocking elements are composed of metal.

8. The pressure container defined in claim 7 wherein said heat-blocking elements are L-section shoes passing through windows formed in said shell.

9. The pressure container defined in claim 4 wherein said vessel is composed of cast metal or concrete.

* * * * *